…

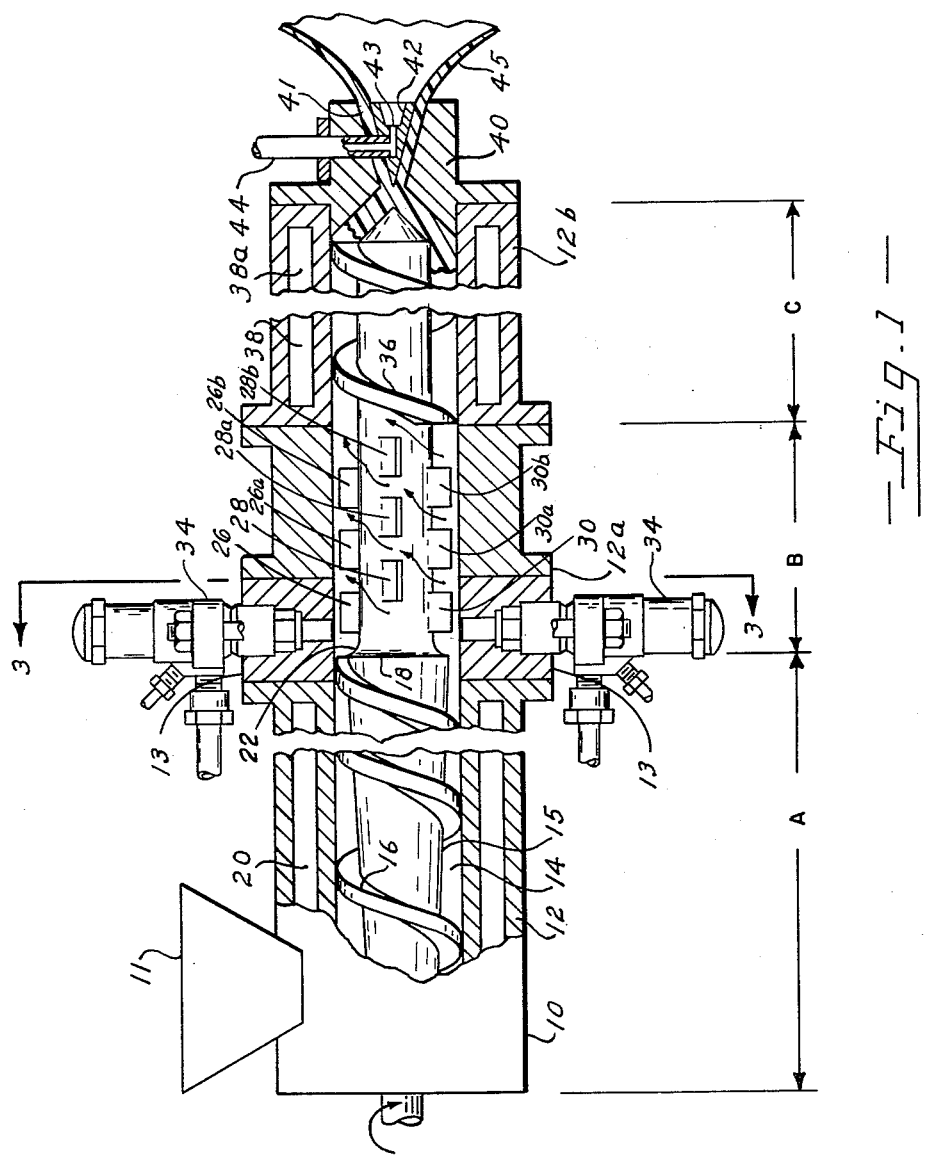

3,160,688
EXTRUSION PROCESS
Ardashus A. Aykanian, Wilbraham, Edgar E. Hardy, Longmeadow, and George A. Latinen, Wilbraham, Mass., assignors to Monsanto Company, a corporation of Delaware
Filed June 2, 1961, Ser. No. 114,401
7 Claims. (Cl. 264—53)

This invention relates to a method for incorporating liquid substances into thermoplastic resins. In particular, the invention is concerned with a method for simultaneously incorporating a normally liquid foaming agent in a thermoplastic resin and extruding the resulting foamable resin composition.

Most thermoplastic resins, before being fabricated into their ultimately used form, are compounded with other materials such as plasticizers, pigments, antioxidants, flame retarding agents, foaming agents and the like. In preparing such resin compositions, it is common practice to admix the components and then pass them through an extruder in which the resin is melted and the other components are uniformly dispersed throughout the melted resin. This method is not well adapted for incorporating liquid substances into thermoplastic resins as liquids tend to interfere with the efficient feeding of the resin particles into the extruder.

It has been proposed that the aforementioned difficulties be overcome by injecting liquid substances into the melted thermoplastic resin within the extruder. This proposal has not achieved wide success for at least two reasons. First, the liquid substance that is injected into the melted thermoplastic resin tends not to be uniformly dispersed therethrough. Second, the melted thermoplastic resin tends to plug the openings through which the liquid substance is injected into the extruder.

It is an object of this invention to provide an improved method for injecting liquid substances into a melted thermoplastic resin within an extruder.

Another object of the invention is to provide an improved method for injecting a volatile liquid foaming agent into a melted thermoplastic resin within an extruder.

A further object of the invention is to provide an improved method for extruding foamed thermoplastic resins and particularly foamed styrene polymers in which the thermoplastic resin is fed to an extruder and a volatile liquid foaming agent is injected into the melted resin within the extruder.

Other objects and advantages of the invention will be apparent from the following detailed description thereof when read in conjunction with the attached drawing in which:

FIG. 1 is a side elevation, partially in section, of one embodiment of the invention.

The attached drawing illustrates one embodiment of the invention in which a liquid foaming agent is injected into a melted resin and the resulting composition is extruded as a blown foamed resin film.

Referring to FIG. 1, the apparatus consists of an extruder 10 which includes a feed hopper 11, a barrel which consists of sections 12, 12a and 12b, which are held together by bolts not shown, a cylindrical chamber 14 provided in the barrel, and a screw 15. As illustrated, extruder 10 is divided into 3 functional zones, viz., a plasticating zone designated as A, an injection zone designated as B, and a diffusion and cooling zone designated as C.

In Zone A, barrel section 12 includes a chamber 20 through which heat transfer fluid can be circulated by means not shown. Screw 15 is provided with a helical land 16 and, as viewed from left to right, has a root which uniformly increases in diameter until it reaches a maximum at 18. After reaching a maximum at 18, the root diameter of screw 15 decreases rapidly to form a shoulder 22 and then remains constant throughout Zone B.

In Zone B, four series of axially aligned scraper plates or fingers 26, 26a, 26b; 28, 28a, 28b; 30, 30a, 30b; and 32, 32a, 32b (not shown) are symmetrically disposed about and mounted on screw 15. The series of scraper plates 28, 28a, 28b and 32, 32a, 32b are displaced slightly in an axial direction from the corresponding series of scraper plates 26, 26a, 26b and 30, 30a, 30b. As thus positioned, scraper plates 28 and 32 are transversely aligned with the passage ways provided between scraper plates 26 and 26a, and 30 and 30a. In a like manner scraper plates 28a and 32a are transversely aligned with the passage ways provided between scraper plates 26a and 26b, and 30a and 30b; scraper plates 26a and 30a are transversely aligned with the passage ways provided between scraper plates 28 and 28a, and 32 and 32a; and 26b and 30b are transversely aligned with the passage ways provided between scraper plates 28a and 28b, and 32a and 32b. Also provided in Zone B are a series of liquid injectors 34—34 which are radially disposed about barrel section 12b and mounted in inserts 13—13 provided therein.

In Zone C, screw 15 is provided with a helical land 36 and is shown as having a constant root diameter. In actual practice it is preferred that the root diameter of screw 15 in the fore section of Zone C (i.e., adjacent to Zone B) be slightly larger than the root diameter in Zone B and then decrease in diameter in the aft section of Zone C. Barrel section 12b is provided with two separate chambers 38 and 38a through which separate heat transfer fluids can be circulated by means not shown.

A blow film die 40 of conventional construction is attached to the delivery end of barrel section 12b by fastening means not shown. Die 40 includes an annular passage 41 and a centrally located mandrel 42 which contains an air passage 43. A blow pipe 44 is provided to deliver air to passage 43.

In the operation of the embodiment illustrated in FIG. 1, thermoplastic resin particles are fed from hopper 11 directly into chamber 14. To maintain clarity of illustration, however, the resin is not shown in chamber 14 until it passes the tip of screw 15. The resin particles are advanced through Zone A by land 16. As the resin is advanced through chamber 14 it is melted (by means of both the heat transfer fluid circulated through chamber 20 and the frictional heat generated within the chamber) and is placed under substantial pressure as the volume of chamber 14 decreases as the root diameter of screw 15 increases. As is known, the force applied upon the melted resin in Zone A is applied primarily in a direction axial with screw 15. The resin temperature and pressure in Zone A reach a maximum as the resin passes 18.

As the melted resin passes 18 it flows into injection Zone B and its pressure drops substantially as the volume of chamber 14 increases as the root diameter of screw 15 decreases. In Zone B the melted resin is subjected to no mechanical force applied in a direction axial with screw 15. The sole force advancing the melted resin through Zone B is the pressure drop from the end of Zone A to the beginning of Zone C. In contrast to the modest axial forces applied upon the melted resin in Zone B, substantial forces transverse to screw 15 are applied upon the resin by scraper plates 26, 26a, 26b, 28, 28a, 28b, 30, 30a, 30b, 32, 32a, and 32b. As a result of the forces applied in Zone B, the flow pattern of the melted resin is substantially as shown by the flowlines indicated in FIG. 1. This flow pattern brings about substantial mixing of the melted resin, which mixing is greatly facilitated by the high temperature and low viscosity of the resin. A liquid foaming agent such as pentane enters chamber 14 through liquid injectors 34—34 and is rapidly and homogeneously dispersed throughout the melted resin.

The melted resin as it enters Zone C is at a high temperature and has a liquid foaming agent homogeneously dispersed therethrough. To further assure uniform diffusion of the foaming agent throughout the melted resin, the resin is heated in the fore section of Zone C by circulating a heated fluid through chamber 38. As the resin is advanced through the aft section of Zone C, its temperature is lowered by circulating a coolant through chamber 38a. In addition, the pressure on the resin in Zone C is increased due to the restrictive action of the die.

After leaving Zone C the melted resin enters die 40 and is extruded through passage 41 as a seamless tube 45. The tube 45 is delivered to downstream pinch rolls (not shown) and air is blown into the pinched tube 45 through line 44 to expand tube 45 into a large bubble.

The following examples are set forth to illustrate more clearly the principle and practice of this invention to those skilled in the art.

Example I

A blown film of foamed polystyrene is prepared employing an apparatus of the type illustrated in FIG. 1. Chamber 14 is 2.5 inches in diameter and has an overall length of 100 inches. Zone A is 50 inches long, Zone B is 8 inches long and Zone C is 42 inches long.

In Zone A, land 16 has a constant pitch and the first 7.5 L/D section of screw 15 has a root diameter of 1.76", the second 5 L/D section of screw 15 has a root diameter which increases uniformly from 1.76" to 2.16" and the third 7.5 L/D section of screw 15 has a root diameter of 2.16".

In Zone B, screw 15 has a root diameter of 1.75 inches. Four series of scraper plates are provided on screw 15, each of said series containing 8 scraper plates. The length, in an axial direction, of each scraper plate is 0.5 inch and the passage ways provided between adjacent scraper plates are 0.19 inch in length.

In Zone C, land 36 has a constant pitch and the first 7 L/D section of screw 15 has a root diameter of 2.25 inches and the final 10 L/D section of screw 15 has a root diameter of 2.00 inches. Chamber 38 is approximately 17 inches in length, and chamber 38a is approximately 25 inches in length.

Styrene homopolymer particles (approximately 20 mesh) that are admixed with 1% of finely-divided calcium silicate are fed into the extruder from hopper 11 at a rate of 117 lbs./hr. The melted styrene homopolymer as it passes 18 is at a temperature of about 390° F. and under a pressure of about 2500 p.s.i. Immediately after it enters Zone B the pressure on the resin drops to about 1500 p.s.i. and pentane is injected into the melted styrene homopolymer at a pressure of about 2500 p.s.i. and at a rate of about 8 lbs./hr. When the styrene homopolymer enters Zone C its temperature is about 390° F. and its pressure is about 1300 p.s.i. The styrene homopolymer is maintained at a temperature of approximately 390° F. throughout the first 17 inches of Zone C by circulating hot oil through chamber 38 and is then cooled to a temperature of about 295° F. in the final 25 inch section of Zone C by circulating a coolant through chamber 38a. The pressure on the styrene homopolymer as it leaves Zone C is about 2500 p.s.i. The styrene homopolymer passes through a screen and breaker plate assembly not shown in FIG. 1 and enters die 40 at a pressure of about 1500 p.s.i. A blown foamed polystyrene film is obtained at a rate of about 125 lbs./hr. The film has a density of about 6 lbs./ft.$^3$ and a majority of the cells thereof have diameters of less than about 0.01 inch. The film has a uniform density throughout its mass.

Comparable results are obtained in the above example when the pentane foaming agent is replaced with, respectively, n-butane, dichlorodifluoromethane or a pentane-liquid carbon dioxide mixture (in a 95/5 weight ratio).

Example II

An unfoamed sheet of polystyrene having 5% of tris-(2,3-dibromopropyl)phosphate incorporated therein is prepared employing an apparatus identical with that described in Example I except that (a) the blow film die is replaced with a sheet die of conventional construction and (b) in Zone A the screw is modified so that the first 7.5 L/D section of screw 15 has a root diameter of 1.90" the second 5 L/D section of screw 15 has a root diameter which uniformly increases from 1.90" to 2.30" and the third 7.5 L/D section of screw 15 has a root diameter of 2.30".

Styrene homopolymer particles (approximately 20 mesh) are fed into the extruder from hopper 11 at a rate of about 125 lbs./hr. The melted styrene homopolymer as it passes 18 is at a temperature of about 425° F. and under a pressure of about 2200 p.s.i. In Zone B tris(2,3-dibromopropyl)phosphate is injected into the melted styrene homopolymer at a pressure of about 2800 p.s.i. and at a rate of about 6.3 lbs./hr. When the styrene homopolymer enters Zone C its temperature is about 425° F. and its pressure is about 1300 p.s.i. The styrene homopolymer is maintained at a temperature of approximately 425° F. throughout Zone C by circulating hot oil through chambers 38 and 38a. The pressure on the styrene homopolymer as it leaves Zone C is about 2500 p.s.i. The styrene homopolymer passes through a screen and breaker plate assembly not shown in FIG. 1 and enters the sheet die at a pressure of about 1500 p.s.i. A polystyrene sheet is obtained at a rate of about 130 lbs./hr. The tris(2,3-dibromopropyl)phosphate is uniformly dispersed throughout the polystyrene sheet.

The extrusion apparatus of the invention is a single screw extruder which contains three separate functional zones or sections. The first of plasticating zone of the extruder melts and delivers the melted resin to the second zone at a high temperature and pressure. The structure and design of the screw in the first zone may take a wide variety of forms, but typically consists of a constant pitch screw which increases in root diameter in the downstream direction. Heating means are usually included in the first zone to assist in melting the resin. If desired, the first zone may consist of two elements, as for example by having a plasticizing extruder arranged in tandem with the feed zone of a second extruder and delivering melted resin thereto.

The second or injection zone of the extruder differs significantly in structure from extruders previously known in the art. In the second zone the screw does not contain a land, but rather a plurality of series of aligned scraper plates or fingers. Each such series contains a plurality of scraper plates (typically three or more) which are closely positioned to each other, but which provide passage ways therebetween. Preferably, the axial length of the individual scraper plates is greater than the width of the passage ways provided between the scraper plates.

The several series of scraper plates (a minimum of three and preferably four or more) are symmetrically disposed about the screw. Each series is displaced slightly in an axial direction from the two adjacent series so that its scraper plates are transversely aligned with the passage ways provided between the scraper plates of the adjacent series. As thus arranged, the scraper plates impart a substantial shearing and mixing action to the melted resin.

The resin contacting faces of the scraper plates are preferably aligned susbtantially with the axis of the screw, although in some cases it is possible to align the scraper plates at not more than a 30° angle from the axis of the screw. A clearance of the order of a few thousandths of an inch is normally provided between the tips of the scraper plates and the chamber wall.

Means are included in the second zone for injecting a liquid into the melted resin at a controlled rate. It is preferred to employ a plurality of such injection means and to have them symmetrically disposed about the chamber wall. The injection means employed must be capable of delivering the liquid into the extrusion apparatus at a pressure in excess of the pressure developed within the melted resin. Preferably, the injection means should be capable of delivering the liquid to the extruder at a pressure substantially higher than the pressure of the melted resin, e.g., at a pressure of at least about 500 p.s.i. higher than the pressure of the melted resin.

The third zone of the extruder performs two functions. First, the pressure on the melted resin is increased to the level required to express the resin through the die. Second, the melted resin is cooled (or in some circumstances heated) to substantially the temperature at which it will leave the die. To properly cool (or heat) the resin, at least the aft section of the third zone should include external heat transfer means. Depending upon the length of the second zone of the extrusion apparatus, it is sometimes desirable to maintain the mixture melted resin and liquid at a relatively high temperature in the fore section of the third zone. In this event, external heating means may be provided to heat the chamber wall of the fore section of the third zone. In addition, the root diameter of the screw may be increased in the fore section of the third zone so that frictional heat will be developed within the resin. In this event, however, the root diameter is preferably subsequently decreased in the aft section of the third zone.

The die affixed to the extrusion apparatus may be of any design presently used in extruding thermoplastic resins. Scores of suitable dies are known and reported in the art.

In carrying out the process of the invention the resin is heated to a high temperature and placed under substantial pressure in the first zone of the extruder. It is essential that the resin be heated to a high temperature so that it will have a relatively low viscosity as it enters the second zone. Preferably, the melted resin should be heated to a temperature at which it has a viscosity of less than about $1.5 \times 10^4$ poises and more especially less than about $6 \times 10^3$ poises. It is good practice to place the resin under substantial pressure in the first zone, as essentially the only force available to advance the melted resin through the second zone will be the pressure differential existing between the end of the first zone and the beginning of the third zone. Typically, it is desirable to develop a pressure of the order of 1700–2700 p.s.i. on the resin in the first zone.

In the second zone of the extruder, the resin is normally maintained at substantially the maximum temperature that it attains in the first zone. If necessary, external heat may be supplied to the resin in the second zone to maintain it at this temperature. The liquid substance that is to be incorporated into the resin is injected into the melted resin at a pressure substantially higher than the pressure developed within the resin itself. Specifically, it is preferred to inject the liquid into the melted resin at a pressure at least about 500 p.s.i. and more especially at least about 1000 p.s.i. higher than the pressure of the melted resin. The use of such a high pressure insures that the liquid will be injected to a substantial depth in the melted resin. This in turn, facilitates the attainment of a homogeneous dispersion of the liquid in the melted resin. The rotation of the screw imparts forces upon the melted resin in a direction transverse to the flow of the resin through the second zone. This action imparts a mixing action to the melted resin and assures the attainment of a homogeneous mixture of the melted resin and the liquid.

In the third zone of the extruder, the pressure on the melted resin will be increased to that required to express the resin through the die. Normally, this pressure will be at least of the order of about 2500 p.s.i. In addition, the melted resin will be cooled (or in rare cases heated) in at least the aft section of the third zone. The precise temperature to which the resin will be cooled (or heated) will depend upon a number of variables such as the nature of the resin being extruded, the nature and quantity of the liquid dispersed throughout the resin, etc. The selection of the proper discharge temperature is well within the knowledge and skill of these familiar with this art.

After leaving the third zone of the extruder, the homogeneous mixture of melted resin and liquid may be expressed through the die into any desired physical form such as a blown film, a sheet, etc. When a mixture of polystyrene and a hydrocarbon foaming agent is extruded as illustrated in the drawings, the extrusion temperature at the die should be about 285–315° F.

The thermoplastic resins which may be employed in the process of the present invention include cellulose ethers and esters, e.g., ethyl cellulose, cellulose acetate, cellulose acetate-butyrate; polycarbonates; polyamides; polyesters; polyformaldehyde; homopolymers and interpolymers of monomeric compounds containing the vinylidene grouping $CH_2=C<$ such as vinyl halides, e.g., vinyl chloride, vinyl bromide; vinylidene chloride; olefins, e.g., ethylene, propylene, isobutylene; vinyl esters of carboxylic acids, e.g., vinyl acetate, vinyl propionate, vinyl benzoate; vinyl ethers, e.g., vinyl methyl ether, vinyl isobutyl ether; unsaturated carboxylic acids and derivatives thereof, e.g., acrylic acid, methacrylic acid, acrylic acid and methacrylic acid esters of alcohols containing 1–18 carbon atoms, e.g., methyl and ethyl methacrylate, acrylamide, acrylonitrile; vinyl aromatic compounds, e.g., styrene, vinyl toluene, p-ethylstyrene, 2,4-dimethylstyrene, o-chlorostyrene, 2,5-dichlorostyrene, and vinyl naphthalene; and interpolymers of vinylidene monomers of the above type with alpha,beta-unsaturated polycarboxylic acids and derivatives thereof, e.g., maleic anhydride, diethyl maleate, dibutyl fumarate, etc. It is feasible and sometimes desirable to employ blends of two or more thermoplastic resins, such as, e.g., blends of polystyrene with rubbery diene polymers such as natural rubber, butadienestyrene interpolymers, butadiene-acrylonitrile interpolymers and the like. Styrene graft copolymers prepared by polymerizing monomeric styrene, either alone or in admixture with other monomers such as acrylonitrile, in the presence of a rubbery diene polymer also may be employed advantageously. Especially suitable are styrene polymers having polymerized therein at least 50% by weight of styrene, e.g., styrene homopolymers and interpolymers of styrene with vinylidene monomers such as acrylonitrile, methyl methacrylate, alpha-methylstyrene, butadiene and the like.

Any desired liquid substance can be incorporated into the resin by the present invention. Low melting solids such as waxes and the like can, if desired, be melted and injected into a resin by the method of this invention. Liquified gases, e.g., those which can be liquified at temperatures of the order of 0° C. under pressures of the order of 2000–3000 p.s.i. can also be used under proper conditions. The invention is particularly valuable, however, in incorporating a volatile liquid foaming agent into a thermoplastic resin.

The foaming agents which may be employed in the invention are volatile compounds which can be injected into the melted resin in the liquid state. Preferably, the foaming agents employed should be non-reactive organic compounds which have at most a slight solvent action on the thermoplastic resin and have atmospheric boiling points in the range of from about −10 to about 100° C. and more especially from about 10 to about 80° C. These include, for example, aliphatic hydrocarbons such as butane, pentane, isopentane, hexane, isohexane, cyclohexane, etc.; certain halogenated aliphatic hydrocarbons such as ethyl chloride, propyl chloride, isopropyl bromide, butyl chloride, and particularly perchlorofluorocarbons such as dichlorodifluoromethane, monochlorotrifluoromethane, trichloromonofluoromethane, 1,1,2,2 - tetrachloro-1,2-difluoroethane, and the corresponding perchlorofluorocarbons set forth in U.S. 2,848,428 at column 3, lines 30–41; aliphatic amines such as ethylamine, propylamine, isopropylamine, dimethylamine, etc.; aliphatic ethers such as diethyl ethers, diisopropyl ether, methyl ethyl ether, ethyl isopropyl ether, etc.; acetaldehyde, etc. For a listing of other foaming agents that can be employed see U.S. 2,681,321. Mixtures of two or more such foaming agents can be employed. It has been observed that good results are obtained with mixtures of aliphatic hydrocarbons (as above described) and carbon dioxide. Typically such mixtures will contain 70–99.8 weight percent of the aliphatic hydrocarbon and, correspondingly, 30–0.2 weight percent of carbon dioxide. If desired, it is feasible to employ mixtures consisting predominantly of a foaming agent of the type described above with minor amounts of an organic compound having a solvent action on the thermoplastic resin. Typically, such mixtures will contain 70–98 weight percent of the foaming agent and, correspondingly, 30–2 weight percent of the organic compound having solvent action on the thermoplastic resin. Typical of the organic compounds having a solvent action on the thermoplastic resin and which can be used are acetone, methylene chloride, styrene monomer, benzene, xylene, carbon tetrachloride, chloroform, etc. Preferably, the organic compound should have an atmospheric boiling point not higher than about 80° C.

When incorporating a liquid foaming agent into a thermoplastic resin by the process of this invention, it is desirable to admix with the resin a small quantity of a material which functions to reduce the pore size of the extruded foamed resin ultimately produced. Examples of materials which perform this function are finely-divided calcium silicate and certain hydrated salts as disclosed in U.S. 2,911,382.

Although the invention is primarily concerned with the preparation of extruded foamed thermoplastic resins, it can be readily adapted to prepare unfoamed, but formable resin compositions. In this embodiment of the invention the homogeneous mixture of melted resin and liquid foaming agent is rapidly cooled immediately as it is discharged from the die. The step of cooling the resin as it leaves the die can be carried out in the manner disclosed in published Australian application 43,716/58. The resulting foamable resin compositions thus attained can be chopped into pellets for molding purposes and the like.

The above descriptions and particularly the examples and drawings are set forth for purposes of illustration only. Many variations and modifications thereof will be apparent to those skilled in the art and can be made without departing from the spirit and scope of the invention herein described.

What is claimed is:

1. In a process for preparing a low density, extruded foamed thermoplastic resin by feeding thermoplastic resin to a single screw extruder, melting and forwarding said thermoplastic resin through the extruder, injecting a liquid foaming agent into the melted resin and discharging the foaming agent containing melted resin from a die; the improvement which comprises (1) heating the resin in the first zone of the extruder to a temperature such that the melted resin has a viscosity of less than about $1.5 \times 10^4$ poises, (2) subjecting the melted resin to a pressure of at least about 1700 p.s.i. in the first zone of the extruder, (3) delivering the melted resin from the first zone of the extruder to the second zone of the extruder, (4) maintaining the melted resin at substantially the temperature specified in Step (1) throughout the second zone of the extruder, (5) injecting a liquid foaming agent into the melted resin in the second zone of the extruder, (6) subjecting the melted resin to substantial mechanical forces transverse to the screw in the second zone of the extruder, (7) delivering the mixture of melted resin and liquid foaming agent from the second zone of the extruder to the third zone of the extruder, (8) increasing the pressure on the mixture of the melted resin and liquid foaming agent in the third zone of the extruder, (9) cooling the mixture of melted resin and liquid foaming agent in at least the aft section of the third zone of the extruder, and (10) delivering the mixture of melted resin and liquid foaming agent from the third zone of the extruder to the die.

2. The process of claim 1 in which the liquid foaming agent is injected into the melted resin at a pressure at least about 500 p.s.i. higher than the pressure of the melted resin in the second zone of the extruder.

3. The process of claim 1 in which the thermoplastic resin is a styrene polymer having polymerized therein at least 50% by weight of styrene.

4. The process of claim 3 in which the liquid foaming agent is a perchlorofluorocarbon.

5. The process of claim 3 in which the liquid foaming agent is a mixture of (a) an aliphatic hydrocarbon having an atmospheric boiling point in the range of about $-10$ to about 100° C. and (b) carbon dioxide.

6. In a process for preparing a low density, extruded foamed polystyrene by feeding polystyrene to a single screw extruder, melting and forwarding said polystyrene through the extruder, injecting a liquid foaming agent into the melted polystyrene and discharging the foaming agent containing melted polystyrene from a die; the improvement which comprises (1) heating the polystyrene to a temperature of at least about 390° F. in the first zone of the extruder, (2) subjecting the melted polystyrene to a pressure of at least about 1700 p.s.i. in the first zone of the extruder, (3) delivering the melted polystyrene from the first zone of the extruder to the second zone of the extruder, (4) maintaining the melted polystyrene at a temperature of at least about 390° F. throughout the second zone of the extruder, (5) injecting a liquid aliphatic hydrocarbon into the melted polystyrene in the second zone of the extruder, said aliphatic hydrocarbon having an atmospheric boiling point in the range of about 10–80° C., (6) subjecting the melted polystyrene to substantial mechanical forces transverse to the screw in the second zone of the extruder, (7) delivering the mixture of melted polystyrene and liquid hydrocarbon from the second zone of the extruder to the third zone of the extruder, (8) increasing the pressure on the mixture of melted polystyrene and liquid hydrocarbon in the third zone, (9) cooling the mixture of the melted polystyrene and liquid hydrocarbon to a temperature of about 285–315° F. in the third zone of the extruder, and (10) delivering the mixture of melted polystyrene and liquid hydrocarbon from the third zone of the extruder to the die.

7. In a process for preparing a foamable thermoplastic resin composition by feeding thermoplastic resin to a single screw extruder, melting and forwarding said thermoplastic resin through the extruder, injecting a liquid foaming agent into the melted resin, discharging the foaming agent containing melted resin from a die, and cooling the foaming agent containing melted resin after it leaves the die; the improvement which comprises (1) heating the resin in the first zone of the extruder to a temperature such that the melted resin has a viscosity of less than about $1.5 \times 10^4$ poises, (2) subjecting the melted resin to a pressure of at least about 1700 p.s.i. in the first zone of the extruder, (3) delivering the melted resin from the first zone of the extruder to the second zone of the extruder, (4) maintaining the melted resin at substantially the temperature specified in Step (1) throughout the second zone of the extruder, (5) injecting a liquid foaming agent into the melted resin in the second zone of the extruder, (6) subjecting the melted resin to substantial mechanical forces transverse to the screw in the second zone of the extruder, (7) delivering the mixture of melted resin and liquid foaming agent from the second zone of the extruder to the third zone of the extruder, (8) increasing the pressure on the mixture of the melted resin and liquid foaming agent in the third zone of the extruder, (9) cooling the mixture of melted resin and liquid foaming agent in at least the aft section of the third zone of the extruder, (10) delivering the mixture of melted resin and liquid foaming agent from the third zone of the extruder to the die, and (11) rapidly cooling the mixture of melted resin and foaming agent immediately as it is discharged from the die.

References Cited in the file of this patent

UNITED STATES PATENTS

| | | |
|---|---|---|
| 2,200,997 | Royle | May 14, 1940 |
| 2,518,124 | Corbett | Aug. 8, 1950 |
| 2,537,977 | Dulmage | Jan. 16, 1951 |
| 2,617,167 | Johnson | Nov. 11, 1952 |
| 2,785,455 | McElroy | Mar. 19, 1957 |
| 2,838,794 | Munger et al. | June 17, 1958 |
| 2,860,377 | Bernhardt et al. | Nov. 18, 1958 |
| 2,886,014 | Konrad et al. | May 12, 1959 |
| 2,901,185 | Dickey | Aug. 25, 1959 |
| 2,928,130 | Gray | Mar. 15, 1960 |
| 2,987,774 | Jacobson | June 13, 1961 |
| 2,991,503 | Rietz | July 11, 1961 |
| 3,011,217 | Carlson | Dec. 5, 1961 |

FOREIGN PATENTS

| | | |
|---|---|---|
| 1,003,469 | France | Mar. 18, 1952 |